(12) United States Patent
Cayrol

(10) Patent No.: US 6,621,418 B1
(45) Date of Patent: Sep. 16, 2003

(54) DEVICE WARNING AGAINST THE PRESENCE OF DANGEROUS OBJECTS

(76) Inventor: Christophe Cayrol, 49 Boulevard Calmette, F-30400 Villeneuve-les-Avignon (FR)

(*) Notice: Subject to any disclaimer, the term of this patent is extended or adjusted under 35 U.S.C. 154(b) by 0 days.

(21) Appl. No.: 10/088,012

(22) PCT Filed: Sep. 11, 2000

(86) PCT No.: PCT/FR00/02495

§ 371 (c)(1),
(2), (4) Date: Mar. 14, 2002

(87) PCT Pub. No.: WO01/20368

PCT Pub. Date: Mar. 22, 2001

(30) Foreign Application Priority Data

Sep. 14, 1999 (FR) .............................. 99 11496

(51) Int. Cl.⁷ ............................................. G08B 23/00
(52) U.S. Cl. ................. 340/573.1; 340/573.4; 340/691.1; 340/552; 340/825.19; 342/61; 342/350
(58) Field of Search ................ 340/573.1, 573.4, 340/691.1, 691.2, 540, 552, 825.19, 7.58, 7.6, 7.59, 407.1, 407.2; 342/61, 718, 147, 146, 350, 357.01; 367/93, 94, 99

(56) References Cited

U.S. PATENT DOCUMENTS

| | | | | |
|---|---|---|---|---|
| 3,612,061 A | * | 10/1971 | Collins ........................ 607/148 |
| 3,628,193 A | * | 12/1971 | Collins ......................... 623/24 |
| 3,998,209 A | * | 12/1976 | Macvaugh ................... 128/848 |
| 4,205,671 A | * | 6/1980 | Lassen ......................... 128/886 |
| 4,390,756 A | * | 6/1983 | Hoffmann et al. ............ 607/56 |
| 4,520,501 A | * | 5/1985 | DuBrucq ..................... 704/271 |
| 4,813,419 A | * | 3/1989 | McConnell .................. 607/56 |
| 4,982,432 A | * | 1/1991 | Clark et al. ................. 704/271 |
| 4,999,607 A | * | 3/1991 | Evans ......................... 340/533 |
| 5,449,002 A | * | 9/1995 | Goldman ..................... 600/592 |
| 5,894,271 A | * | 4/1999 | Namisniak .................. 340/407.2 |
| 5,928,133 A | * | 7/1999 | Halyak ........................ 600/26 |
| 5,982,286 A | * | 11/1999 | Vanmoor ................. 340/573.4 |
| 6,334,073 B1 | * | 12/2001 | Levine ......................... 607/58 |
| 6,466,911 B1 | * | 10/2002 | Cowan et al. ............. 704/271 |
| 6,486,784 B1 | * | 11/2002 | Beckers .................... 340/573.1 |

* cited by examiner

Primary Examiner—Benjamin C. Lee
(74) Attorney, Agent, or Firm—Sughrue Mion, PLLC

(57) ABSTRACT

The present invention relates to devices enabling a person moving along a given path to be warned against the presence on the path of objects that might present a danger for that person. The device of the invention is characterized essentially by the fact that it comprises object detection means 1, said detection means being suitable for delivering a detection signal on an output 2, a change of state in this signal being indicative of the presence of an object in a predetermined zone of the path, means 3 for connecting the connection means to a first portion 4 of the body of the person, and means 5 for converting the detection signal into an electrical function-stimulating signal acting on a second portion 6 of the body of the person. The device of the invention is particularly advantageously applicable to enabling combatants to detect explosive mines or the like.

Figure 1:
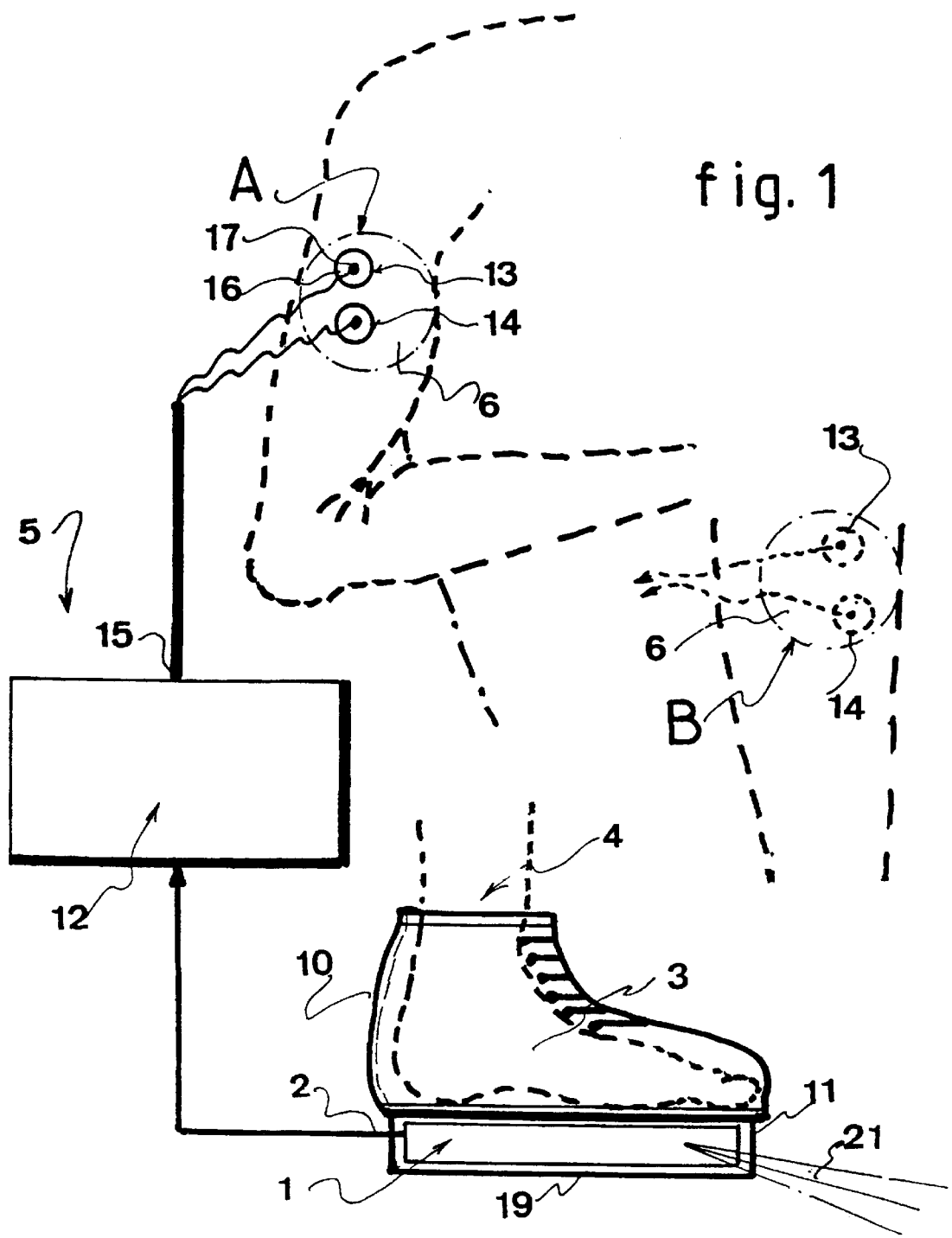

17 Claims, 2 Drawing Sheets

DEVICE WARNING AGAINST THE PRESENCE OF DANGEROUS OBJECTS

The present invention relates to devices for warning a person moving along a given path against the presence on the path of objects that might present a danger for that person, and more particularly, but not exclusively, it relates to devices for providing individual protection against objects such as explosive mines or the like.

Devices are already known for detecting and locating objects which are hidden from human view by other materials, for example by being buried in the ground, in sand, etc.

Some of those known devices operate by detecting metals used in making such objects, e.g. making use of the ability of metals to reflect certain electromagnetic waves.

For that purpose, those devices essentially comprise two antennas, a transmitting antenna for transmitting electromagnetic waves and a receiving antenna suitable for picking up waves reflected on the reflecting portions of buried objects. By analyzing the signal delivered at the output from the receiving antenna, it is possible to determine whether or not an object is present, for example a mine that might be dangerous.

Naturally, there exist other types of detectors for detecting objects buried in the ground or in any other material, and operating on the basis of physical properties of said objects other than the ability to reflect electromagnetic waves. Thus, there exist detectors based on receiving magnetic radiation, visible or invisible light waves, sound waves, chemical reactions, etc.

All those object-detection devices are well known in themselves and are not described in greater detail herein, particularly since they are readily available in the trade and anyone can easily get hold of one.

It is also recalled that devices are known which enable specialists, such as mine-clearance experts, etc., to detect the presence of possibly dangerous objects, e.g. explosive mines, on a given path, which objects could prevent people from moving along the path in safety.

In outline, those devices comprise an object detector placed at one end of a pole, the other end of the pole having means enabling the expert to hold it and move the object detector out in front in order to look for and locate any such objects. It is therefore quite clear that those devices prevent the people that use them from performing any function other than locating mines or the like.

In particular, they cannot reasonably be used by people needing to move along a given path where the ground is likely to contain mines or the like, but who are supposed to be performing functions other than mine clearance, for example as combatants or the like. Under such circumstances, they cannot simultaneously carry and hold both an object-detection device as described above, and also their normal combat equipment, guns, or the like.

It is true that combatants are generally called on to advance along paths from which specialist services have already cleared the mines. However, there is always the risk of some mines being overlooked, and in particular numerous operations need to be capable of being carried out as quickly as possible, before it has been possible to clear the mines from a path that is to be taken by such combatants or the like.

Devices have therefore been developed that make it possible to warn such people when a suspect object has been detected so that they can avoid going any further forwards. Such devices are described, for example, in GB-A-2 123 559 and in DE-A-30 27 189. Those devices essentially comprise an alarm constituted by a vibrator, for example, which is pressed against the skin of the person. With such a device, the person must begin by perceiving the signal delivered by the alarm, must then understand it, and must finally take the appropriate mental action to stop and withdraw a leg, e.g. by pulling it back. The time required for those four operations to be performed, corresponding to a stimulation reflex, is about one hundred milliseconds.

An object of the present invention is to provide a device making it possible to warn a person moving along a given path against the presence on the path of an object that might be dangerous for that person, and a device which serves, in particular, to relieve that person of the constraints associated with manual use of prior art object detector devices, while still providing good safety to a person advancing along the path, and above all, enabling that person to stop advancing along the path much more quickly than is possible with prior art devices of the kind outlined above.

More precisely, the present invention provides a device for warning a person moving along a given path against the presence on the path of objects that might be dangerous for that person, the device comprising:

detection means for detecting said objects, said detection means being suitable for delivering a detection signal on an output, a change of state in said signal being indicative of the presence of said object in a predetermined zone of said path; and means for connecting the object detection means to a first portion of the body of said person;

the device being characterized by the fact that it further comprises means for converting said detection signal into an electrical function-stimulating signal acting on a second portion of the body of said person.

Figure 2:
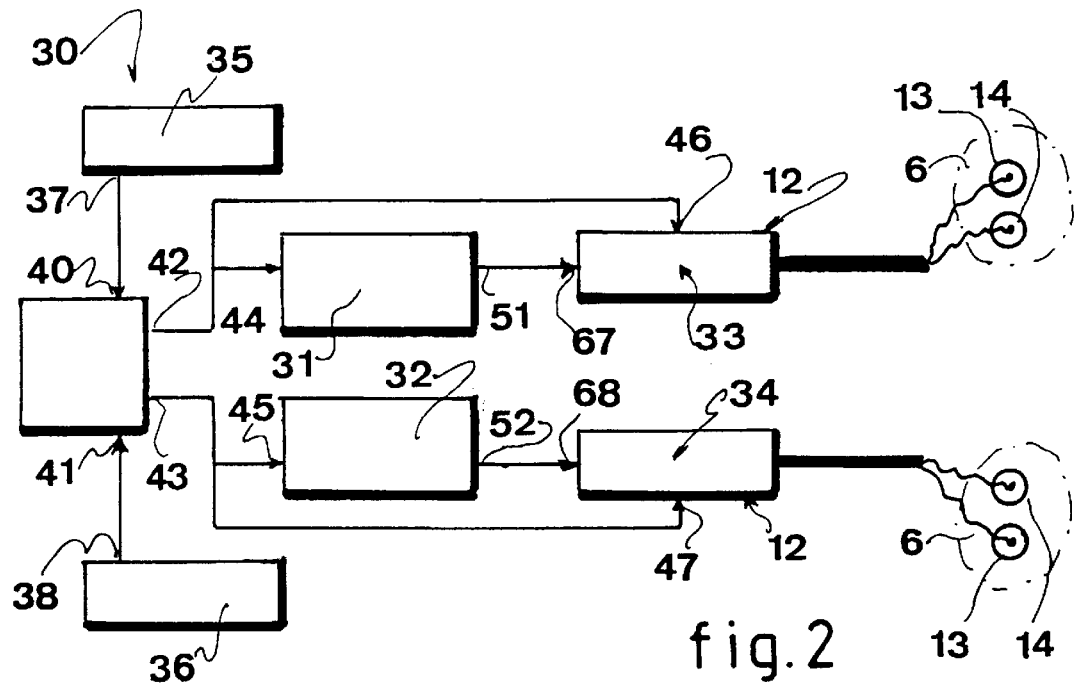
Figure 3:
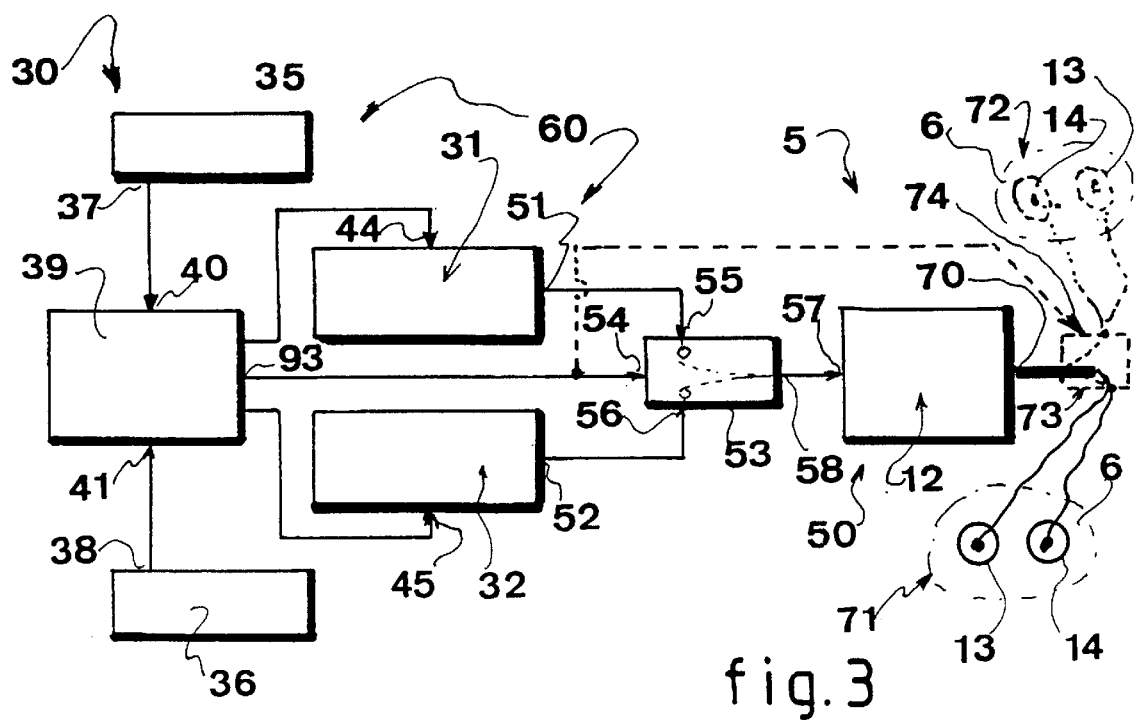

Other characteristics and advantages of the invention appear from the following description given with reference to the accompanying drawings, which are illustrative but not limiting in any way:

FIG. 1 is a diagram showing the principle enabling a device of the invention to warn a person moving along a given path against the presence on the path of objects that might be dangerous for that person; and FIGS. 2 and 3 are block diagrams showing the principles of two embodiments of improvements to the FIG. 1 device.

FIG. 1 is a diagram showing the principle whereby a device of the invention can warn a person moving along a given path against the presence on said path of objects that might be dangerous for that person, it being specified that the device can be used regardless of the nature of said objects, even though a particularly advantageous application thereof lies in a system for providing an individual with protection against antipersonnel mines or the like. It is also stated that the term "path" is used to mean any zone of any kind whatsoever over which a person can advance, without putting limits on the nature of said zone, and without putting limits in space or time.

The device comprises object-detector means 1 suitable for delivering a detection signal at an output 2, a change of state in the detection signal being indicative of the presence in a determined zone of the path of one of the objects that it can detect. It is specified that the term "change of state" means any detectable variation in a signal, for example a change of sign, a change of frequency, crossing a determined threshold, etc.

The object detection means 1 comprises at least one object detector 19 of the type outlined in the introduction of the present description, whose operation is based, for example, on one of the following physical phenomena:

receiving electromagnetic waves reflected on given materials; receiving magnetic radiation; receiving visible or invisible light waves; receiving sound waves.

The device also comprises means 3 for connecting said object detection means 1 to a first portion 4 of the person's body, and means 5 for converting the detection signal into an electrical function-stimulating signal that acts on a second portion 6 of the body of the same person.

By way of advantageous example, the means 3 for connecting the object detection means to a first portion 4 of the body of the person are constituted by a boot 10, the first portion 4 of the body then.being the foot of the person which is suitable for being put into the boot, the object detector 19 being secured to the boot 10, for example by being embedded or enclosed in its sole 11, as shown in FIG. 1.

It is also stated that the means 3 for connecting the object detection means 1 to a first portion of the body of said person can also be constituted by means of a bracelet suitable for being worn around a limb of that person, the object detector 19 then being secured to the bracelet. By way of example, the bracelet can be placed around an ankle of the user of the device of the invention, or else around a wrist, for example when the person needs to advance on all fours or by crawling.

The means 5 for converting the detection signal obtained at the output 2 from the object detection means 1 into an electrical function-stimulating signal acting on a second portion 6 of the body of the same person can be constituted in various ways.

Preferably, this electrical function-stimulating signal is a stimulation signal applied to muscular nerve points and to muscles that need to be contracted, e.g. between a nerve point of the person's body associated with one or more muscles and a motor point for said muscles, as described below.

The means 5 can then advantageously by constituted by a converter 12 for converting the detection signal into an electrical signal of given magnitude, and two electrodes 13, 14 connected to the output 15 of the converter 12, these two electrodes being adapted to be applied against the second portion 6 of the body of the person who is to receive the electrical function-stimulating signal.

These two electrodes are situated on the skin in such a manner as to be close respectively to the nerve trunk associated with the muscle and to a motor point of the muscle.

By way of example, the electrodes can be of the type used by doctors for making electrocardiograms or the like, being constituted by sticky patches 16 suitable for adhering to the skin of the human body, having an electrically conductive point 17 substantially in the center that can be put into intimate contact with the skin when the patch is pressed against the part of the body that is to receive an electrical pulse. These electrodes are thus constituted, for example, by sticky patches made using an insulating film and a conductive film suitable for coming into contact with the skin.

In this above-mentioned advantageous embodiment, the converter 12 is designed to deliver electrical pulses at its output 15 that are advantageously of duration shorter than about 0.75 milliseconds (ms), modulated at a frequency lying in the range 1 hertz (Hz) to 100 Hz, and at a current lying in the range about 0.5 milliamps (mA) and 100 mA.

By way of illustrative and explanatory example, the two electrodes 13, 14 are shown in FIG. 1 as being disposed on two different possible locations on the human body. In part A of FIG. 1, these electrodes 13, 14 are placed to cooperate with the biceps of an arm in the manner described above. In part B of FIG. 1, they are placed on the shin, i.e. in cooperation with the muscle known as the anterior tibial muscle, with a first electrode being placed close to the top of the fibula, i.e. close to the nerve trunk of the sciatic nerve, and with the other electrode being placed close to the popliteal cavity, i.e. on the inside of the leg.

The above-described device operates and as is used as follows:

When a person having responsibilities as mentioned above needs to move along a path that might include objects that could be dangerous, the person wears a boot including an object detector 19, with the two electrodes 13, 14 being applied, for example, to a leg as mentioned above and as shown diagrammatically in part B of FIG. 1, advantageously to the same leg as the foot wearing the boot 10.

When that person raises the foot wearing the boot 10 and moves it forwards to take a step, the object detection cone 21 of the object detector 19 scans the portion of the path on which the person is about to step.

If the detector 19 detects an object buried in that portion of the path before the person puts the foot down in the ground, the object detection means 1 deliver a detection signal which is converted by the converter 12 into an electrical function-stimulating signal which is applied via the electrodes 13, 14 to a leg muscle. This muscular stimulation leads to the user's foot being withdrawn automatically with a response time that is measured to lie in the range twenty to forty milliseconds, which represents a saving in time of better than fifty percent compared with the response time obtained with prior art devices, and this is considerable in the context of an application to detecting explosive mines.

The embodiment of the device described above with reference to FIG. 1 gives good results. Nevertheless, having only one of a person's the two feet fitted with the object detection means 1 can lead to a detection zone that is not sufficient. Full satisfaction can be obtained only with a device that operates on each step to scan the portion of the path that corresponds to two steps. For such detection to work, it is necessary to use object detectors having detection cones of relatively large apex angle. But that condition goes against detector sensitivity, since it is well known that for best possible detection, it is necessary for the detection cone to have an angle at the apex that is as small as possible.

Thus, in order to increase the reliability of the device and thus increase the safety of the person wearing it, the device of the invention can advantageously present one of the two configurations shown diagrammatically in FIGS. 2 and 3 respectively.

In the embodiment of FIG. 2, the object detection means 1 comprise two object detectors 31 and 32 of the same type as the object detector 19 in the embodiment described with reference to FIG. 1. Like the preferred embodiment described above, the means 3 for connecting the object detection means 1 to a first portion of the body of the person are constituted by two boots suitable for being worn by that person, with the object detectors 31 and 32 being secured to respective ones of the two boots, e.g. by being embedded or enveloped in the soles thereof.

In the FIG. 2 embodiment, the means 5 for converting the detection signal into an electrical function-stimulating signal for stimulating a second portion 6 of the body of the person comprise two electrical function-stimulation lines 33 and 34, each including at least one signal converter 12 and means for applying the signals delivered at the output of the converter to a second portion 6 of the body of the person, the input of each converter constituting the input of each electrical function-stimulating line, the inputs 67 and 68 of the two electrical function-stimulating lines 33 and 34 being connected to respective outputs 51 and 52 of the two object detectors 31 and 32. The means for applying the signals delivered to the output of each converter to the second portion 6 of the body of the person are constituted, for example, by pairs of electrodes 13 and 14 as described above, each pair of electrodes being applied, for example, to the leg that corresponds to the foot wearing the boot containing the associated detector.

Advantageously, in order to obtain coherent operation of the device, in particular in order to avoid interference between the detectors, the device also includes means 30 for detecting the movement of each foot of the person relative to the ground and means for switching on the two object detectors 31 and 32 as a function of foot movement.

These means 30 are constituted, for example, by motion sensors 35 and 36 suitable for delivering on respective outputs 37 and 38 signals that are representative of the state of motion of each foot relative to the ground.

These sensors 35 and 36 can be constituted in various ways. For example, they can be constituted by strain gauges mounted to cooperate with each boot and arranged to output a signal whenever the boot leaves the ground, the operation of the strain gauges being based, for example, on the pressure exerted on the sole of the boot when the person is standing and the foot is resting on the ground. Making such strain gauges and integrating them in a boot does not present any particular difficulty for the person skilled in the art, so they are not described in greater detail herein.

The means 30 for detecting movement of each foot relative to the ground also include a control member 39 having two inputs 40, 41 receiving the signals delivered via the respective outputs 37 and 38 of the motion sensors 35 and 36. This control member is arranged to deliver signals via two outputs 42 and 43 that are representative of the state of motion of each of the two feet, these two outputs 42 and 43 being connected respectively to control inputs 44 and 45 of the two object detectors 31 and 32, and possibly also, where necessary, to respective control inputs 46 and 47 of the two electrical function-stimulating lines 33 and 34. In the embodiment shown, these control inputs are the control inputs of the two converters 12. The control member 39 is arranged to respond to the signals delivered at the outputs of the motion sensors 35 and 36 and to deliver control signals on its own outputs 42 and 43 that are connected respectively to the control inputs 44 and 45 of the two object detectors 31 and 32 in such a manner that, while the person is walking along the path, said control signals interrupt the operation of the object detector 31 or 32 which is associated with the boot that is on the ground, while keeping the object detector which is associated with the raised boot in operation.

The device is described above as having two detectors associated with the two feet respectively of the person by means of boots; however, it is also possible to implement another embodiment of the device in which the two detectors are associated with two limbs of that person by means of two bracelets.

The device shown in FIG. 2 operates as follows:

Overall, it operates like the device shown in FIG. 1, but because it has two object detectors 31 and 32 respectively associated with the two feet of the person, its performance is better than that of the device shown in FIG. 1. The FIG. 2 device is suitable for detecting the presence of an object each time the person advances one foot in front of the other, regardless of which foot is concerned. This makes it possible to use object detectors having detection cones with apex angles that are much smaller, and which are therefore more sensitive.

Furthermore, while the person is advancing step by step along the path, the two motion sensors 35 and 36 each associated with a respective one of the two feet, output signals which act via the control member 39 to switch off the operation of the object detectors in alternation. Thus, the object detectors operate alternately as the person moves forward step by step. Each object detector operates only while the corresponding foot is moving.

The embodiment shown in FIG. 3 is identical in principle to that shown in FIG. 2.

However, in this embodiment, the means 5 for converting the detection signal into an electrical function-stimulating signal acting on a second portion of the body of the person comprise a single electrical function-stimulating line 50 of structure identical to that of each of the lines 33 and 34 described above, but also including a changeover switch 53 interposed between the input 55 of the electrical function-stimulating line 50 and the respective outputs 51 and 52 of the two object detectors 31 and 32.

This changeover switch 53 has two feed inputs 55 and 56, an output 58, and a control input 54 for controlling switchover. The two feed inputs 55 and 56 are respectively connected to the outputs 51 and 52 of the object detectors 31 and 32, and its output 58 is connected to the input 57 of the electrical function-stimulating line 50.

The means 5 also includes means 60 for controlling switchover of the switch 53, as explained below.

The means 60 for controlling switchover of the switch 53 advantageously make use of both motion sensors and 36 and of the control member 39, as in the embodiment shown in FIG. 3. In this case, the control input 54 of the switch 53 is connected to a third output 93 of the control member 39.

The electrical function-stimulating line 50 thus has only two electrodes 13, 14, positioned at a single location on a second portion 6 of the body of the person, e.g. on an arm as shown in part A of FIG. 1. This electrical function-stimulating signal 50 is connected to the object detector 31, 32 which is in operation, i.e. the detector which is associated with the boot that is not resting on the ground. While the person is walking forwards step by step, the electrical function-stimulating line is connected in alternation to one or the other of the two detectors.

However, in a preferred embodiment of the invention, the output 70 of the converter 12 is connected to two pairs 71, 72 of two electrodes 13, 14 via a second changeover switch 73 having a control input 74 connected to the output 93 of the control member 39. This embodiment is shown more particularly in dashed lines in FIG. 3. In this way, each pair of electrodes is associated with one of the legs of a user of the device of the invention, and only the muscles of the leg whose object detector is in operation are stimulated when an object is detected. This embodiment is advantageous since, when the leg muscles are stimulated, the other leg does not receive any stimulation, thus leaving the person free to stop moving forwards.

The operation of the embodiment of the device having two detectors respectively associated with two bracelets respectively placed around two limbs of a person can be deduced without difficulty from the operation described above and is therefore not described in greater detail herein.

The embodiment of FIG. 3 presents the advantage of being lighter in weight than that of FIG. 2.

Naturally, the device of the invention can also have self-contained power supply means and other peripheral elements which are generally associated with devices of this kind, e.g. displays, watertight boxes, etc. Such elements are well known to the persons skilled in the art and are therefore not described in greater detail herein.

The above description of the device of the invention for detecting objects buried in the ground or the like, and the description of how it operates suffice to show clearly the advantages of the present device over prior art devices. These advantages are therefore not described in greater detail herein.

What is claimed is:

1. A device for warning a person moving along a given path against the presence on the path of objects that might be dangerous for that person, the device comprising:
    detection means (1) for detecting said objects, said detection means being suitable for delivering a detection signal on an output (2), a change of state in said signal being indicative of the presence of said object in a predetermined zone of said path; and
    means (3) for connecting the object detection means to a first portion of the body of said person; the device being characterized by the fact that it further comprises means (5) for converting said detection signal into an electrical function-stimulating signal acting on a second portion of the body of said person.

2. A device according to claim 1, characterized by the fact that said object detection means (1) comprise at least one object detector (19), the operation of said object detector being based on at least one of the following physical phenomena: receiving electromagnetic waves reflected on given materials; receiving magnetic radiation; receiving visible or invisible light waves; receiving sound waves; chemical reactions.

3. A device according to claim 2, characterized by the fact that the means (3) for connecting the object detection means (1) to a first portion of the body of said person are constituted by a boot (10) suitable for being worn by said person, the object detector (19) being secured to the boot (10).

4. A device according to claim 3, characterized by the fact that the object detector (19) is secured to the boot by being embedded in the sole (11) of said boot (10).

5. A device according to claim 2, characterized by the fact that the means (4) for connecting the object detection means (1) to a first portion of the body of said person are constituted by at least one bracelet suitable for being worn around a limb of said person, the object detector (19) being secured to said bracelet.

6. A device according to claim 1, characterized by the fact that the means (5) for converting the detection signal into an electrical function-stimulating signal acting on a second portion of the body of said person are constituted by a converter (12) for converting the detection signal obtained at the output (2) of the detection means (1) into an electrical signal of given value, and two electrodes (13, 14) which are connected to the output (16) of the converter (12), the two electrodes (13, 14) being adapted to be applied to said second portion (6) of the body of the person.

7. A device according to claim 6, characterized by the fact that at least one of the two electrodes is constituted by a sticky patch (16) and an electrical conduction point (17) situated substantially in the center of said patch, said electrical conduction point being suitable for coming into contact with the skin of the body when the patch is stuck to the skin.

8. A device according to claim 6, characterized by the fact that the converter (12) is arranged to deliver electrical pulses at its output (15), the pulses being of duration shorter than about 0.75 ms, being modulated at a frequency lying in the range 1 Hz to 100 Hz, and delivering a current lying in the range 0.5 mA to 100 mA.

9. A device according to claim 1, characterized by the fact that the object detection means (1) comprise at least two object detectors (31, 32), the operation of said object detectors being based on at least one of the following physical phenomena: receiving electromagnetic waves reflected on given materials, receiving magnetic radiation, receiving visible or invisible light waves, receiving sound waves.

10. A device according to claim 9, characterized by the fact that said means (3) for connecting the object detection means (1) to a first portion (4) of the body of said person comprise two boots (10) suitable for being worn respectively on the two feet of said person, said two object detectors (31, 32) being secured to said two boots (10) respectively.

11. A device according to claim 10, characterized by the fact that said two object detectors (31, 32) are secured to the two boots (10) respectively by being embedded in their soles (11).

12. A device according to claim 10, characterized by the fact that it further comprises means (30) for detecting motion of the two feet of said person relative to the ground, and means for controlling said two object detectors (31, 32) as a function of foot motion.

13. A device according to claim 12, characterized by the fact that the means for detecting the motion of the feet of said person relative to the ground and the means for controlling the two object detectors (31, 32) as a function of foot motion are constituted by two motion sensors (35, 36) mounted to cooperate with the two boots, respectively, each sensor being suitable for delivering signals at an output (37, 38) representative of motion of the foot wearing the boot with which it cooperates, and a control member (39) connecting the outputs (37, 38) of the two sensors (35, 36) to respective control inputs (44, 45) of the two object detectors (31, 32).

14. A device according to claim 13, characterized by the fact that said control member (39) is arranged to receive the signals delivered at the outputs of the motion sensors (35, 36) and to deliver control signals on two outputs (46, 47) respectively connected to the control inputs (44, 45) of the two object detectors (31, 32), in such a manner that while the person is walking along the path, said control signals interrupt the operation of the object detector (31, 32) which is associated with the boot that is resting on the path, and keep the object detector which is associated with the boot which is raised in operation.

15. A device according to claim 9, characterized by the fact that the means (5) of converting the detection signal into an electrical function-stimulating signal acting on a second portion of the body of said portion comprise: en electrical function-stimulating line (50) constituted by at least one signal converter (12) and means for applying the signals delivered at the output of the converter to a second portion (6) of the body of the person, the input (57) of the converter constituting the input of the electrical function-stimulating line, a changeover switch (53) controllable by means of a control input (54), the feed input (55, 56) of said changeover switch being connected to respective outputs (51, 52) of the two object detectors (31, 32), the output (58) of said switch being connected to the input (57) of said electrical function-stimulating line (50) and means (60) for controlling said changeover switch (53) via its control input (54).

16. A device according to claim 14, characterized by the fact that the means (60) for controlling said changeover switch (53) via its control input (54) are constituted by the two motion sensors (35, 36) and by the control member (39) having one of its control outputs (93) connected to the control input (54) of the changeover switch (53).

17. A device according to claim 9, characterized by the fact that the means (5) for converting the detection signal into an electrical function-stimulating signal acting on a second portion of the body of said person comprise two electrical function-stimulating lines (33, 34), each constituted by at least one signal converter (12) and means for applying the signals delivered at the output of the converter to a second portion (6) of the body of the person, the input (67, 68) of the converter constituting the input of the two electrical function-stimulating line, the inputs of the two electrical function-stimulating lines being respectively connected to the outputs (51, 52) of the two object detectors (31, 32).

* * * * *